United States Patent
Kroener et al.

(10) Patent No.: US 10,241,756 B2
(45) Date of Patent: *Mar. 26, 2019

(54) TINY DETECTION IN A FLOATING-POINT UNIT

(71) Applicant: International Business Machines Corporation, Armonk, NY (US)

(72) Inventors: Michael K. Kroener, Altdorf (DE); Silvia M. Mueller, Altdorf (DE); Andreas Wagner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,543

(22) Filed: Jul. 11, 2017

(65) Prior Publication Data

US 2019/0018650 A1 Jan. 17, 2019

(51) Int. Cl.
*G06F 7/487* (2006.01)
*G06F 5/01* (2006.01)

(52) U.S. Cl.
CPC ............ *G06F 7/4876* (2013.01); *G06F 5/012* (2013.01)

(58) Field of Classification Search
USPC .................. 708/501, 503, 523, 627–632
See application file for complete search history.

(56) References Cited

U.S. PATENT DOCUMENTS

| | | | |
|---|---|---|---|
| 7,593,977 B2 | 9/2009 | Cornea-Hasegan | |
| 7,720,900 B2 | 5/2010 | Gerwig et al. | |
| 8,037,118 B2 * | 10/2011 | Quinnell | G06F 7/483 |
| | | | 708/501 |
| 8,671,129 B2 | 3/2014 | Brooks et al. | |
| 8,868,632 B2 | 10/2014 | Cornea-Hasegan | |
| 9,104,474 B2 | 8/2015 | Kaul et al. | |
| 9,122,517 B2 | 9/2015 | Boersma | |
| 9,542,154 B2 | 1/2017 | Rubanovich | |
| 2003/0158879 A1* | 8/2003 | Kwon | G06F 7/5443 |
| | | | 708/603 |
| 2006/0117082 A1 | 6/2006 | Lutz et al. | |
| 2006/0179093 A1 | 8/2006 | Powell, Jr. | |

(Continued)

FOREIGN PATENT DOCUMENTS

| | | |
|---|---|---|
| CN | 104321741 A | 1/2015 |
| WO | 2014004220 A1 | 1/2014 |

OTHER PUBLICATIONS

Original U.S. Appl. No. 15/810,033, filed Nov. 11, 2017.
Appendix P List of IBM Patents or Applications Treated as Related. Dated Nov. 14, 2017. Two Pages.

(Continued)

*Primary Examiner* — Tan V Mai
(74) *Attorney, Agent, or Firm* — Edward P. Li

(57) ABSTRACT

A floating-point unit for performing tiny detection in floating-point operations. The floating-point unit is configured to implement a fused-multiply-add operation on three wide operands. The floating-point unit comprise: a multiplier, a left shifter, a right shifter a select circuit comprising a 3-to-2 compressor, an adder connected to the dataflow from the select circuit, a first feedback path connecting a carry output) of the adder to the select circuit, and a second feedback path connecting an output of the adder to the left and right shifters for passing an intermediate wide result through the left and right shifters. The adder is configured to provide an unrounded result for tiny detection.

13 Claims, 7 Drawing Sheets

(56) References Cited

U.S. PATENT DOCUMENTS

| | | |
|---|---|---|
| 2006/0184601 A1 | 8/2006 | Trong |
| 2010/0063987 A1 | 3/2010 | Boersma |
| 2011/0040815 A1* | 2/2011 | Penton ............ G06F 7/483 708/205 |
| 2012/0011181 A1* | 1/2012 | Samy ............. G06F 7/483 708/204 |
| 2012/0016919 A1 | 1/2012 | Anderson |
| 2012/0072703 A1* | 3/2012 | Srinivasan ........ G06F 9/3893 712/221 |
| 2012/0215823 A1 | 8/2012 | Lutz |
| 2014/0004220 A1 | 1/2014 | Coudiere |
| 2014/0006467 A1 | 1/2014 | Samudrala |
| 2014/0188966 A1 | 7/2014 | Galal |
| 2014/0379773 A1 | 12/2014 | Rubanovich |
| 2015/0370537 A1 | 12/2015 | Kim |
| 2016/0048374 A1 | 2/2016 | Argade et al. |
| 2016/0077802 A1 | 3/2016 | Samudrala |
| 2016/0098249 A1 | 4/2016 | Carlough et al. |
| 2017/0039033 A1 | 2/2017 | Samudrala |
| 2017/0090868 A1* | 3/2017 | Lutz ............... G06F 7/487 |
| 2018/0203667 A1 | 7/2018 | Babinsky |

OTHER PUBLICATIONS

Huang et al., "Low-Cost Binary128 Floating-Point FMA Unit Design with SIMD Support", IEEE Transactions on Computers, vol. 61, Issue 5, May 2012, (pp. 745-751).

Nathan et al., "Recycled Error Bits: Energy-Efficient Architectural Support for Floating Point Accuracy", International Conference for High Performance Computing, Networking, Storage and Analysis, Nov. 16-21, 2014, (pp. 117-127).

Jose et al., "Floating-Point Single-Precision Fused Multiplier-adder Unit on FPGA", ISBN: 978-989-98875-1-0, 2014, (pp. 15-21).

Original U.S. Appl. No. 15/406,910, filed Jan. 16, 2017.

Jun et al. "Design and Implementation of a Quadruple Floating-point Fused Multiply-Add Unit". Published by Atlantis Press, Paris, France. © the authors. pp. 1749-1753.

Erle et al. "Decimal Floating-Point Multiplication Via Carry-Save Addition". 18th IEEE Symposium on Computer Arithmetic(ARITH'07). Copyright IEEE. Ten pages.

Appendix P List of IBM Patents Treated as Related. dated Oct. 4, 2018. Two pages.

PCT/IB2018/050101 International Search Report and Written Opinion dated May 4, 2018.

* cited by examiner

TINY DETECTION IN A FLOATING-POINT UNIT

BACKGROUND

The present invention relates generally to a floating-point unit in a computer system, and more particularly to a floating-point unit in a computer system for performing tiny detection in floating-point operations.

The IEEE-754-2008 Standard for Binary Floating-point Arithmetic, published in 2008, specifies a floating-point data architecture that is commonly implemented in computer hardware, such as floating-point processors having multipliers. The format includes a sign, an unsigned biased exponent, and a significand. The sign bit is a single bit and is represented by an "S". The unsigned biased exponent, represented by an "e", for example, 8 bits long for single precision, 11 bits long for double precision, and 15 bits long for quadruple precision. The significand is, for example, 24 bits long for single precision, 53 bits long for double precision, or 113 bits long for quadruple precision. As defined by the IEEE-754-2008 standard the most significant bit of the significand, i.e. the so called implicit bit, is decoded out of the exponent bits.

Processors are frequently required to perform mathematical operations using floating-point numbers. Often, a specialized hardware circuit (i.e., a floating-point hardware unit) is included in the microprocessor or electrically coupled to the microprocessor to perform floating-point operations that have three operands, such as the multiply-add operations. Such floating-point operations may be performed faster by using a floating-point unit than they are performed in software, and the software execution unit of the microprocessor would then be free to execute other operations.

However, when floating-point numbers are used in mathematical operations, the result of the operation may be too large or too small to be represented by the floating-point unit. When the result is too large to be represented by the floating-point unit, an "overflow" condition occurs. When the result is too small to be represented by the floating-point unit, an "underflow" condition occurs, and the result is said to be "tiny". Tiny is the range of numbers between the smallest normalized number and zero. So all subnormal numbers in binary floating point format are tiny. In either case (overflow or underflow), a software routine might be executed to perform the operation if accurate results are required. In such an instance, the system may be burdened by the overhead of both the execution time of the floating-point unit and the execution time of the software routine even though only a single floating-point operation is being performed.

SUMMARY

In one aspect, a floating-point unit for performing tiny detection in floating-point operations is provided. The floating-point unit comprises a multiplier connected to a dataflow for multiplication two operands and configured to compute a carry-save product iteratively, wherein a sum term and a carry term are separated into a high part and a low part of the carry-save product. The floating-point unit further comprises a left shifter connected to the dataflow for a high part and a low part of an addend operand, wherein the left shifter is configured to deliver an aligned part of the addend. The floating-point unit further comprises a right shifter connected to the dataflow for the high part and the low part of the addend operand, wherein right shifter is the configured to deliver aligned part of an addend. The floating-point unit further comprises a select circuit connected to outputs of the left shifter and the right shifter, wherein the select circuit comprises a 3-to-2 compressor to combine the sum term and the carry term with the addend. The floating-point unit further comprises an adder connected to the dataflow from the select circuit. The floating-point unit further comprises a first feedback path connecting a carry output of the adder to the select circuit, wherein the first feedback path performs a wide addition operation of the carry-save product and the addend, for the high part and the low part of the carry-save product and the high part and the low part of the addend operand, in two subsequent additions, thus generating an intermediate wide result. The floating-point unit further comprises a second feedback path connecting an output of the adder to the left shifter and the right shifter, wherein the second feedback path passes the intermediate wide result through the left shifter and the right shifter for normalization and through the adder for rounding, thus generating a rounded result. The floating-point unit further comprises the adder configured to provide an unrounded result for the tiny detection in the floating-point operations.

In another aspect, a method for performing tiny detection in floating-point operations with a floating-point unit is provided. The method comprises connecting a multiplier to a dataflow for multiplication two operands and configuring the multiplier to compute a carry-save product iteratively, wherein a sum term and a carry term are separated into a high part and a low part of the carry-save product. The method further comprises connecting a left shifter to the dataflow for a high part and a low part of an addend operand, configuring the left shifter to deliver an aligned part of the addend. The method further comprises connecting a right shifter to the dataflow for the high part and the low part of the addend operand, configuring the right shifter to deliver aligned part of an addend. The method further comprises connecting a select circuit to outputs of the left shifter and the right shifter, wherein the select circuit comprises a 3-to-2 compressor to combine the sum term and the carry term with the addend. The method further comprises connecting an adder to the dataflow from the select circuit. The method further comprises connecting a carry output of the adder to the select circuit by a first feedback path, wherein the first feedback path performs a wide addition operation of the carry-save product and the addend, for the high part and the low part of the carry-save product and the high part and the low part of the addend operand, in two subsequent additions, thus generating an intermediate wide result. The method further comprises connecting an output of the adder to the left shifter and the right shifter by a second feedback path, wherein the second feedback path passes the intermediate wide result through the left shifter and the right shifter for normalization and through the adder for rounding thus generating a rounded result. The method further comprises configuring the adder to provide an unrounded result for the tiny detection in the floating-point operations.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
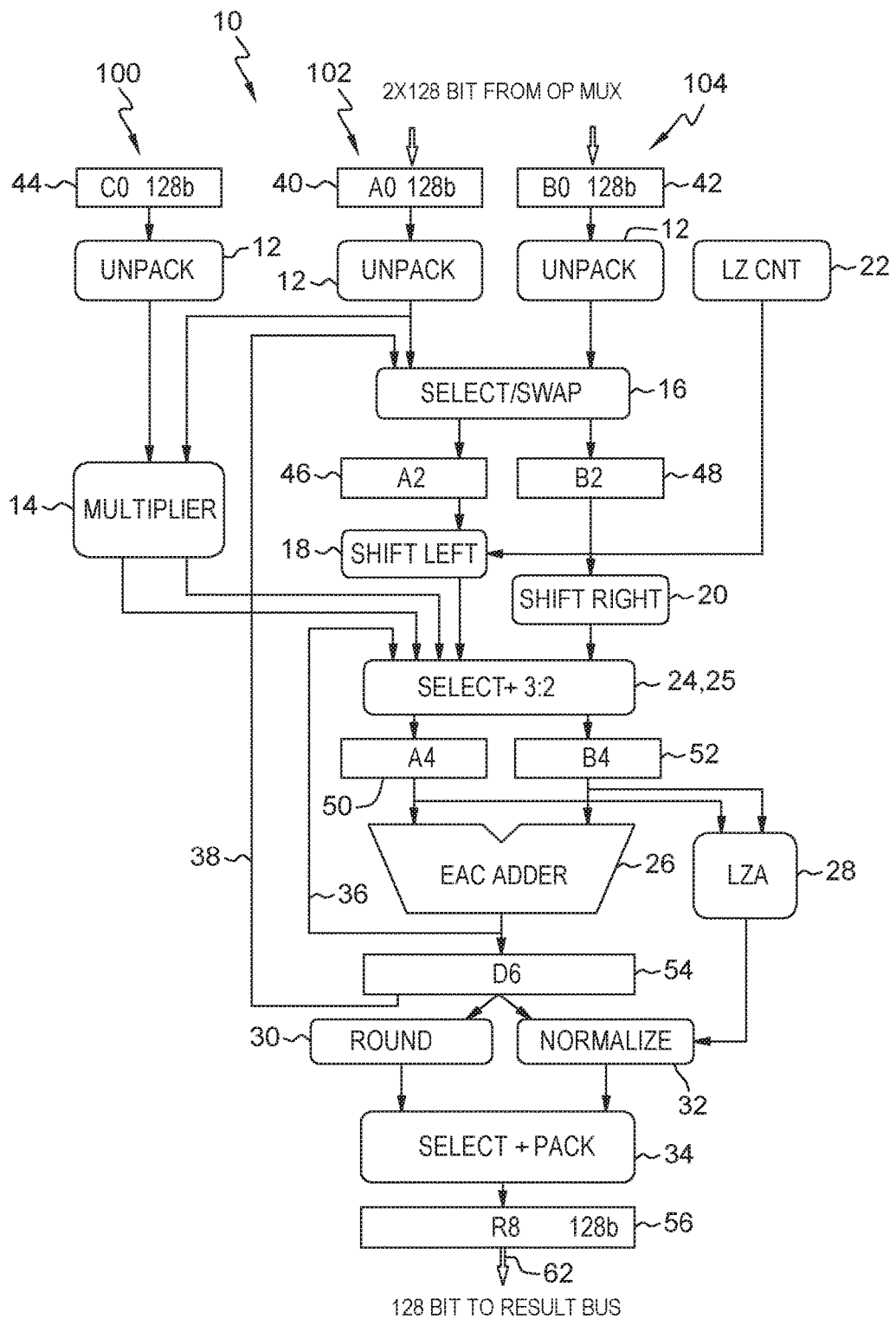
FIG. 1 is a diagram illustrating a data flow of a floating-point unit for performing binary floating-point arithmetic calculations, in accordance with one embodiment of the present invention.

As used herein, the term "tiny detection" represents a check of a number for being tiny, i.e., being a non-zero number that is smaller in magnitude than the smallest normalized number.

For clarification it may be noted that a shifter may be implemented as a shifter circuit, an adder as an adder circuit and a counter as a counter circuit.

According to the IEEE-754-2008 Standard for Binary Floating-point Arithmetic published in 2008, the floating-point instructions provide a main result, and in addition are required to detect exceptions. One of the exceptions is the underflow condition; it means checking that the result prior to rounding is tiny, i.e., a non-zero intermediate result is smaller in magnitude than the smallest normalized number.

In conventional multiply-add based floating-point units (FPUs), adding and rounding is done in separate steps, so that the tiny check can be performed straight forward.

Other implementations of the fused multiply-add operation (FMA) use floating-point data paths which split the calculation in a big-addend and not-big-addend path, also known as far and near path.

For a quad-precision (128-bit) FPU such a split case design may be chosen, because it allows to reduce the area, especially by using an iterative multiplier. Such a design still has a fast, fully pipelined addition/subtraction path and a reasonably fast multiply and FMA path.

Executing an FMA operation on such a split path design combines the addition/subtraction of the fraction or significand with the rounding. It is done in a single, modified addition step. As a consequence, the re-rounding intermediate result is no longer available; just the aligned addend and product and the fully rounded result are available. However, the pre-rounded result is needed to determine a "tiny before rounding" condition for the underflow detection. Thus, the FMA on a split path design considerably complicates the tiny detection.

Yet, fast exception detection is important, especially for quad-precision calculations. With growing problem size, numerical sensitivities of the algorithms are magnified. That degrades the stability of the algorithms and reduces the speed of convergence. This is a well know effect in high performance computing; and the easiest way to address this issue is to switch the mathematically critical routines from double precision to quad precision floating-point (FP-128b). When numerical stability is already an issue, then the arithmetic is getting into the corners of the data range; those corners are protected/detected by IEEE exceptions. With Big Data Analytics, this numerical stability issue is hitting the commercial space.

Embodiments according to the invention show how in a split path FPU design executing FMA, the tiny detection can be derived from a regular tiny detection, despite the fact that addition/subtraction and rounding of the fraction are combined in the same step. For a quad-precision FPU with FMA support this invention allows to use a lower cost split path 128-bit add-based floating-point unit, enhanced by an iterative multiplier, and still do the tiny/underflow detect fully in hardware at full speed. Thus it allows for a fast, cost efficient, fully IEEE compliant implementation, which can even operate for mathematically instable algorithm at full speed.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a unit, system, method and computer program product for implementing a fused-multiply-add operation (FMA) on three 128-bit wide operands. The illustrative embodiments are sometimes described herein using particular technologies only as an example for the clarity of the description.

The illustrative embodiments may be used for implementing a fused-multiply-add operation (FMA) on three 128-bit wide operands, wherein an adder is configured to provide an unrounded result for tiny detection.

The value of a fused-multiply-add operation (FMA) is that one instruction does perform two operations: a multiply operation and an add operation, thus achieving twice the throughput. However, the much higher value of the FMA is the enhanced accuracy of the combined operation: the addition is performed on the exact product and the exact addend.

For 128-bit floating-point calculations, the rounding effect can be much more severe. Thus, when switching to 128-bit floating-point calculations for higher accuracy having an FMA is advantageous. Yet, the 128-bit FMA must have a decent performance as well, to make it attractive and usable for applications.

In floating-point processors, one central area is the multiplier array. The multiplier array is used to do multiplication of two numbers. Usually, state-of-the-art Booth's encoding with radix 4 is employed, which is a commonly used fast multiplication algorithm. This reduces the number of product terms that need to be summed up to n/2+1, where n is the number of bits per operand. The summation is done using a carry-save-adder circuitry which allows processing of all bits in parallel, as opposed to the normal addition where the carry-out of the lower bit position is chained to the next higher position, which is performed usually by a carry-propagate-adder circuitry. The circuitry that does this summation is known in the art as reduction tree. At the end of the reduction tree, there remain two terms, the sum term and the carry term, which represent a summation part of information and a carry part of information, respectively. These terms finally are added with the aligned addend. Again, a carry-save-addition is performed here. Finally, only two terms remain, also a sum term and a carry term, and these two terms must be added using the carry-propagate-adder to generate one final result.

FIG. 1 is a diagram illustrating a data flow of floating-point unit 10 for performing binary floating-point arithmetic calculations, in accordance with one embodiment of the present invention. Floating-point unit 10 (FPU) is configured to implement a fused-multiply-add operation on three 128-bit wide operands A (numeral 102), B (numeral 104), C (numeral 100) for an operation of A×C+B.

Thus, a 128-bit fused-multiply-add operation (FMA) may be executed on a conventional 128-bit floating-point unit with an add-based data flow with only moderate hardware extensions.

Floating-point unit 10 comprises (i) 113×113-bit multiplier 14 connected to the dataflow for multiplication operands 100 and 102, and configured to compute 226-bit-carry-save product 70 (shown in FIG. 3) iteratively, wherein sum term 71 and carry term 74 are separated into high part 72 and 75 and low part 73 and 76 of product 70. Details to the separation into sum term 71 and carry term 74 as well as high part 72 and 75 and low part 73 and 76 are depicted in a data flow in FIG. 3.

Figure 3:
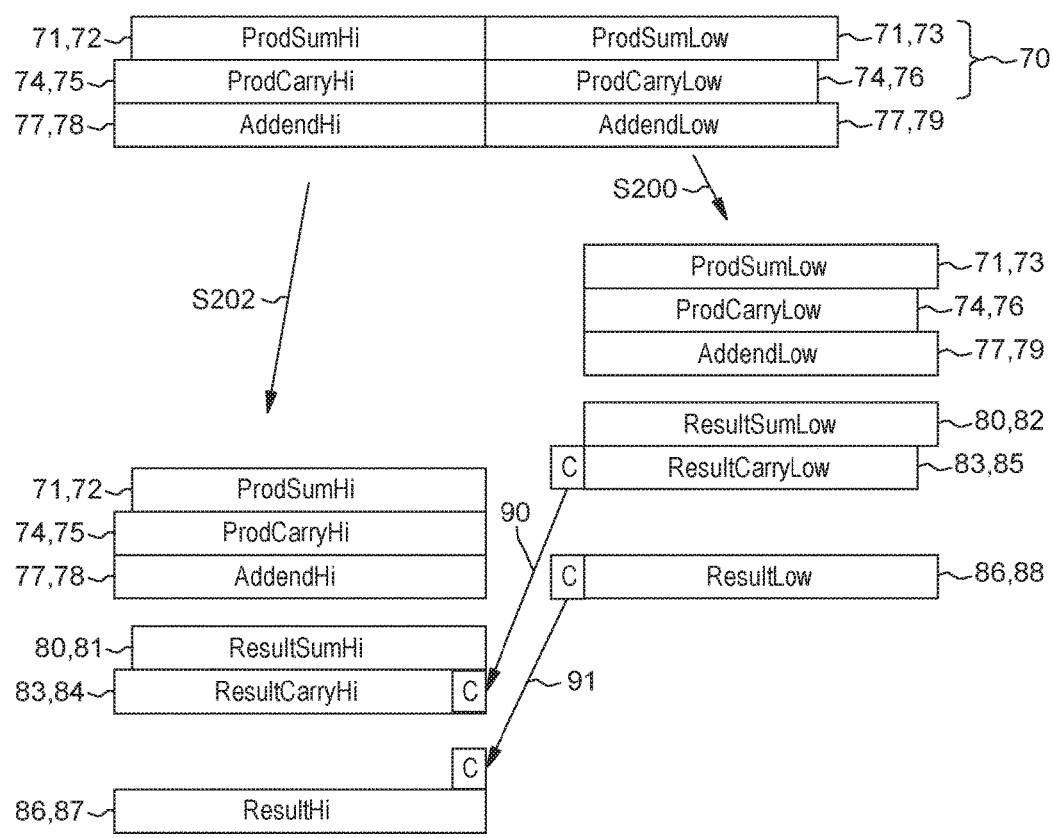
FIG. 3 is a diagram illustrating a data flow in adder loops of the floating-point units of FIG. 1 and FIG. 2, separated into high parts and low parts of the data, in accordance with one embodiment of the present invention.

Floating-point unit 10 further comprises (ii) left shifter 18 connected to the dataflow, for high part 78 (shown in FIG. 3) and low part 79 (shown in FIG. 3) of the addend operand 104, configured to deliver an aligned part of addend 77 (shown in FIG. 3). Floating-point unit 10 further comprises (iii) right shifter 20 connected to the dataflow for high part 78 (shown in FIG. 3) and low part 79 (shown in FIG. 3) of the addend operand 104, configured to deliver the aligned part of addend 77 (shown in FIG. 3). Further, floating-point unit 10 exhibits (iv) select circuit 24 connected to the outputs of shifters 18 and 20, comprising 3-to-2 compressor 25 to combine sum term 71 and carry term 74 with addend 77 (shown in FIG. 3). Floating-point unit 10 further comprises (v) adder 26 connected to the dataflow from select circuit 24. Additionally, floating-point unit 10 comprises (vi) first feedback path 36 connecting carry output 91 (shown in FIG. 3) of adder 26 to select circuit 24 for performing a wide addition operation of intermediate product 70 (shown in FIG. 3) and aligned addend 77 for high parts 72, 75, and 78 and low parts 73, 76, and 79 (shown in FIG. 3) in two subsequent additions thus generating intermediate wide result 86 (shown in FIG. 3). Floating-point unit 10 further comprises (vii) second feedback path 38 connecting the output of adder 26 to shifters 18 and 20 for passing intermediate wide result 86 (shown in FIG. 3) through shifters 18 and 20 for normalization and a second pass through adder 26 for rounding thus generating rounded result 62. Adder 26 is configured to provide unrounded result 60 (shown in FIG. 4 to FIG. 7) for tiny detection, as is described with FIGS. 4c, 5c, 6, and 7.

The 226-bit wide multiplier result as product 70 in sum term 71 and carry term 74 (shown in FIG. 3) is separated into low part 73 and 76 and high part 72 and 75 (shown in FIG. 3) to fit into narrow 128-bit FPU adder 26. Low part 73 and 76 and high part 72 and 75 are sent sequentially through adder 26. Finally, low part 73 and 76 and high part 72 and 75 get merged and rounded or normalized to final result 86 (shown in FIG. 3).

Floating-point unit 10 depicted in FIG. 1 further comprises operand latch 44 and unpack circuit 12 for third operand 100, as well as 113×113 multiplier 14 for getting the 226-bit carry save product 70 (shown in FIG. 3) sequentially in an iterative manner in carry term 74 and sum term 71 (shown in FIG. 3), separated into high part 72 and 75 and low part 73 and 76 of product 70 (shown in FIG. 3). Further, in floating-point unit 10 left shifter 18 is connected to A2 register 46. Alternatively, right shifter 20 may be implemented with a bit rotating function and used in subsequent cycles. Select circuit 24 after shifters 18 and 20 comprises 3-to-2 compressor 25 to combine the two product terms, sum term 71 and carry term 74 with addend 77 (shown in FIG. 3). Leading zero counter 22 is connected to unpack circuit 12 of addend operand 104 (operand B in this embodiment). First feedback path 36 around adder 26, which is an end-around-carry adder, connecting carry output 91 (shown in FIG. 3) of adder 26 to select circuit 24, is provided to implement first feedback path 36 for performing a wide addition operation of intermediate product 70 and aligned addend 77 for high parts 72, 75, and 78 (shown in FIG. 3) and low parts 73, 76, and 79 (shown in FIG. 3). Second feedback path 38, connecting the output of adder 26 to shifters 18 and 20 for passing intermediate wide result 86 through shifters 18 and 20, is provided for normalization and a second pass through adder 26 for rounding.

The data flow shown in FIG. 1 follows in general a top-down structure. Input operands 100, 102, and 104 are latched into input registers 44, 40, and 42, followed by unpacking. Multiplication operands 100 and 102 are fed to multiplier 14. Product 70 (shown in FIG. 3), which is calculated by multiplier 14, is fed to select circuit 24 comprising 3-to-2 compressor 25, and then latched through A4 register 50 and B4 register 52 into adder 26. This is performed together with latching addend operand 104 through select/swap circuit 16 and A2 register 46 and B2 register 48 respectively and optionally shifting by shifters 18 and 20 (which is explained in more details in FIG. 4) to adder 26. Left shifting is dependent on results of leading zero counter 22, calculating a number of leading zeroes of addend 104. Leading zero counter 22 is particularly used with denormal operands. Thus, normalization of a denormal operand is possible before continuing operating with the operand. First feedback loop 36 starts by feeding carry out 91 (shown in FIG. 3) of intermediate low result 88 (shown in FIG. 3) of adder 26 back to select circuit 24 with 3-to-2 compressor 25. Result 87 and 88 (shown in FIG. 3) of adder 26 is fed to D6 register 54 in subsequent cycles, where second feedback loop 38 starts, feeding data back to select/swap circuit 16 for the next iteration. Finally, result 86 (shown in FIG. 3) in D6 register 54 is rounded by round circuit 30 or normalized by normalize circuit 32, depending on results of leading zero anticipator 28. The final result may then be selected and packed in select and pack unit 34 and latched into R8 output register 56, feeding the data to a 128-bit result bus.

The method according to embodiments of the invention may thus comprise: (i) computing 226-bit-carry-save product 70 (shown in FIG. 3) of multiplication operands 100 and 102 iteratively by 113×113-bit multiplier 14, wherein sum term 71 (shown in FIG. 3) and carry term 74 (shown in FIG. 3) are separated into high part 72 and 75 (shown in FIG. 3) and low part 73 and 76 (shown in FIG. 3) of product 70; (ii) aligning at least high part 78 and low part 79 (shown in FIG. 3) of addend operand 104, configured to deliver an aligned part of addend 77 (shown in FIG. 3) by left shifter 18 connected to the dataflow; (iii) aligning high part 78 and low part 79 of addend operand 104 by right shifter 20 connected to the dataflow, configured to deliver the aligned part of addend 77; (iv) combining two product terms 71 and 74 with addend 77 by select circuit 24 connected to the outputs of shifters 18 and 20 comprising 3-to-2 compressor 25; (v) operating adder 26 connected to the dataflow from select circuit 24; (vi) performing wide addition of intermediate product 70 and aligned addend 77 for high parts 72, 75, and 78 and low parts 73, 76, and 79 in two subsequent additions in first feedback path 36 connecting carry output 91 (shown in FIG. 3) of adder 26 to select circuit 24, thus generating intermediate wide result 86 (shown in FIG. 3); and (vii) passing intermediate wide result 86 through shifters 18 and 20 for normalization and a second pass through adder 26 for rounding in second feedback path 38 connecting the output of adder 26 to shifters 18 and 20, thus generating rounded result 62. Advantageously, unrounded result 60 (shown in FIG. 4 to FIG. 7) for tiny detection is provided by adder 26, as explained with FIGS. 4c, 5c, 6, and 7, respectively. Particularly, in an embodiment, the two most significant bits of a significand of unrounded result 60 may be used for tiny detection.

Figure 2:
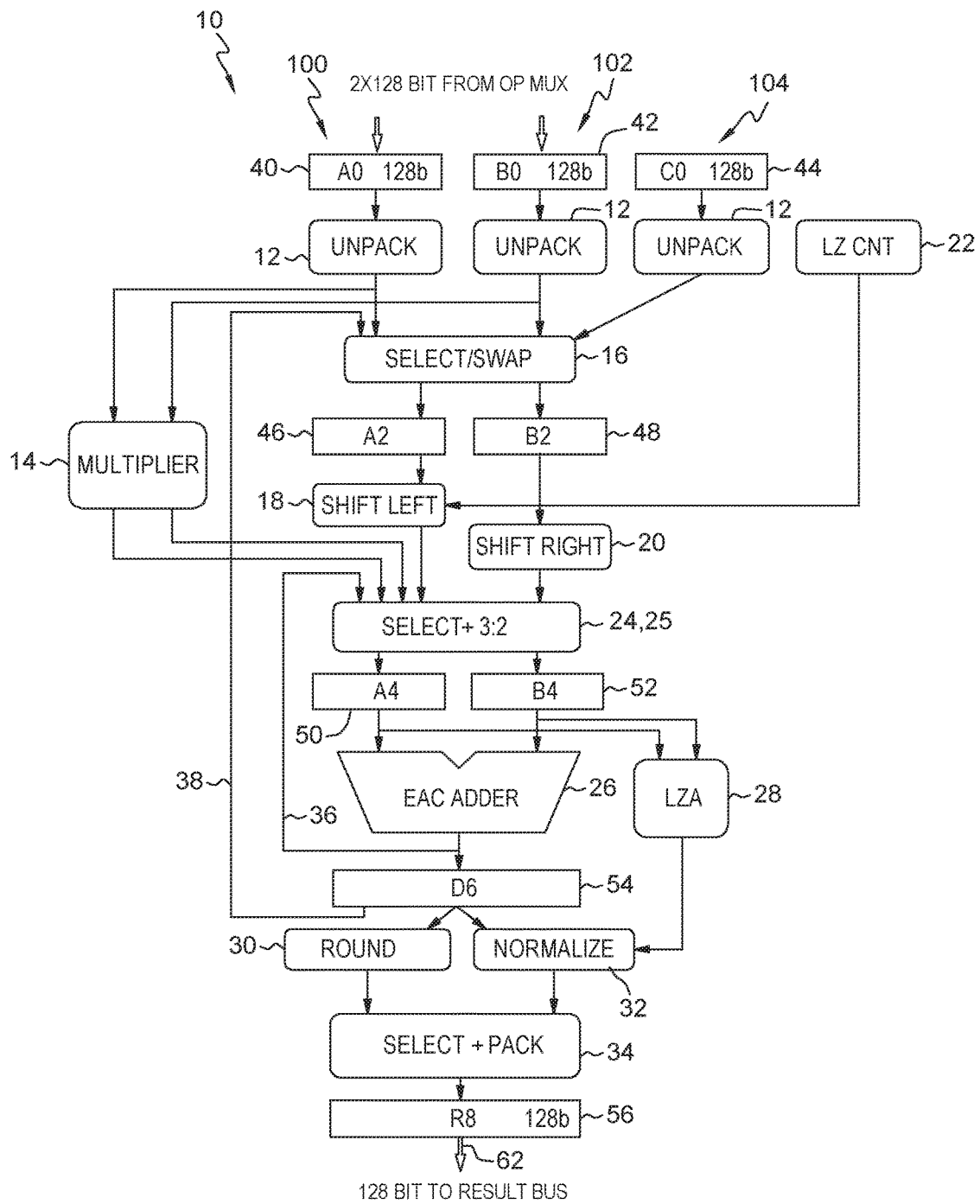
FIG. 2 is a flowchart showing operational steps for a data flow of a floating-point unit for performing binary floating-point arithmetic calculations, in accordance with one embodiment of the present invention.

FIG. 2 is a flowchart showing operational steps for a data flow of a floating-point unit for performing binary floating-point arithmetic calculations, in accordance with one embodiment of the present invention. In FIG. 2, floating-point unit 10 is configured to implement a fused-multiply-add operation on three 128 bit wide operands A (numeral 100), B (numeral 102), and C (numeral 104) for an A×B+C operation. The arithmetic calculation shown in FIG. 2 may be convenient for certain processor types. The data flow in FIG. 2 is quite similar to the data flow shown in FIG. 1; however, in the embodiment shown in FIG. 2, the multiplication operands A, B, and C are represented by numerals 100, 102, and 104, respectively. The principal arithmetical operation in FIG. 2 is the same as in FIG. 1; therefore, the descriptions of FIG. 1 may be used to describe FIG. 2.

FIG. 3 depicts the data flow in adder loops 5200 and 5202 of floating-point unit 10 of FIG. 1 and FIG. 2, separated into high parts 72, 75, and 78 and low parts 73, 76, and 79 of the data. In adder loop 5200, low parts 73, 76, and 79 are computed by adding product sum 71 and carry terms 74 to addend term 77, in order to get low part 82 of sum term 80 as well as low part 85 of carry term 83 and resulting in low part 88 of intermediate result 86. In adder loop 5202, high parts 72, 75, and 78 are computed by adding product sum 71 and carry terms 74 to addend term 77, in order to get high part 81 of sum term 80 as well as high part 84 of carry term 83 and resulting in high part 87 of intermediate result 86. Carry bits 90 and 91 are accordingly shifted from low parts 85 and 88 to high parts 84 and 87.

For a quad precision floating-point unit (FPU), a split path 128-bit FPU design may be used, enhanced with an iterative multiplier to perform a 128-bit fused-multiply-add (FMA) operation. On such a data flow, the FMA execution may be split in a "big-addend" case (where an exponent of an addend minus an exponent of a product is greater than two) and a "not-big-addend" case. For the big-addend case, the effective addition/subtraction of the aligned addend and product is combined with an injection based rounding step. Thus, the intermediate result prior to rounding is not available for the tiny-before-rounding check.

The FMA passes multiple times through 128-bit addition-type FPU 10, as shown in FIG. 1 and FIG. 2.

In the big-addend case, after the addition-round step, a few more cycles are needed to finish the actual arithmetic (e.g. packing into IEEE format), adder 26 may be used twice in two consecutive cycles. First, an addition/subtraction of the fractions including rounding is computed. This may be used for getting final rounded result 62. Next, an addition/subtraction of the fractions without rounding may be computed. This cycle gets the same inputs as the first cycle; since there is no rounding injection applied, the intermediate result is computed prior to rounding, which may be used for a regular tiny detection. Thus, adder 26 may be configured to provide unrounded result 60 (shown in FIG. 4 to FIG. 7) in a second addition or subtraction step without rounding injection. This solution advantageously works for multi-cycle implementations, with a spare adder-cycle being available or in an additional cycle, while the rounded result may be packed. Thus, adder 26 may be configured to execute the second addition or subtraction step in a multicycle operation. For this purpose, adder 26 may comprise an additional instruction for executing the second addition or subtraction step in the multicycle operation. Advantageously, the same hardware may be used for the embodiment where only the control logic may be adapted to receive the unrounded result.

The described implementation may also work for pipelined operations by extending it to a two-cycle-operation due to a corresponding configuration of adder 26.

According to a further embodiment, depicted in FIG. 4 to FIG. 7, adder 26 of FIG. 1 and FIG. 2 is enhanced to carry save adder 92 and compound adder 94 (shown in FIG. 6), in order to perform the addition/subtraction of the fraction and provide rounded result 62 and unrounded result 60 in the same step. The later computed unrounded result 60 may be used to apply the regular tiny check. This enhancement can be done with little additional hardware.

When adding/subtracting the fraction values, one bit may be gained or lost in computing the sum or difference. Thus, the rounding does need to be performed at two different rounding points. Injection rounding does already have (a) two additions on a few low order bits to apply the two possible rounding injections, (b) compound adder 94 (shown in FIG. 6) for the remaining leading bits, computing first intermediate sum 64 (shown in FIG. 4 to FIG. 7) as a result from compound adder 94 and second intermediate sum 66 (shown in FIG. 4 to FIG. 7) as a result from compound adder 94 plus one, and (c) select circuit 95 (shown in FIG. 6) based on the output of the two injection additions and fraction-overflow (carry-out) bit 96 (shown in FIG. 6 and FIG. 7).

According to the further embodiment, for the rounding and non-rounding operations, step (a) is executed for three values instead of two. The one further injection 122 (shown in FIG. 4 to FIG. 7) may be performed with a value zero for an addition step; otherwise, one further injection 122 may be performed with a value one for a subtraction step.

Figure 4A:
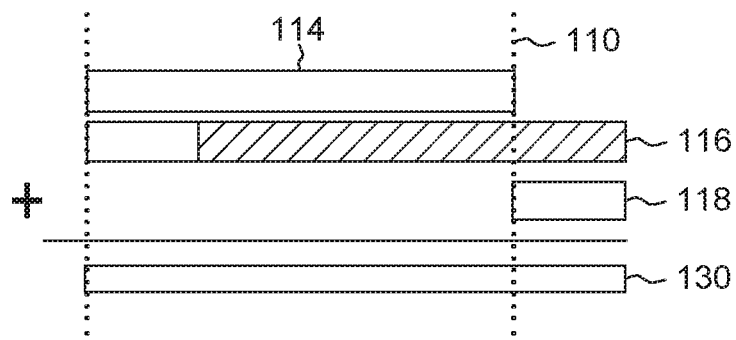
FIG. 4a depicts an adding operation with binary injection based rounding at a first rounding point by a two-bit injection, in accordance with one embodiment of the present invention.
Figure 4B:
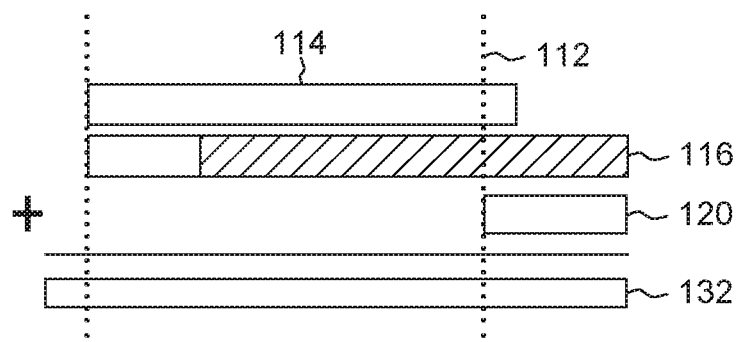
FIG. 4b depicts an adding operation with binary injection based rounding at a second rounding point by a three-bit injection, in accordance with one embodiment of the present invention.
Figure 4C:
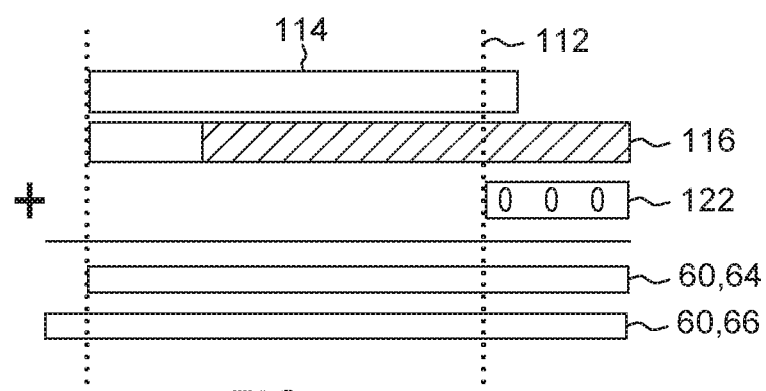
FIG. 4c depicts an adding operation without rounding by an injection of zero for tiny detection, in accordance with one embodiment of the present invention.

FIG. 4a depicts an adding operation of first operand 114 and second operand 116 with binary injection based rounding at first rounding point 110 by two-bit injection 118. FIG. 4b depicts an adding operation with rounding at second rounding point 112 by three-bit injection 120. FIG. 4c depicts an adding operation without rounding by injection 122 of zero for tiny detection according to an embodiment of the invention.

In FIGS. 4a, 4b, and 4c, both operands 114 and 116 are aligned, wherein first operand 114 is bigger than second operand 116. Thus, second operand 116 is shifted to the right compared to first operand 114 due to aligning. The result of the addition of the operands 114 and 116 is rounded by two-bit injection 118 regarding a guard bit and a sticky bit in FIG. 4a, delivering result 130 and by three-bit injection 120 regarding a least significant bit, a guard bit and a sticky bit in FIG. 4b, delivering result 132.

Injection values for two-bit injection 118 may be, for example, for rounding down "00", for rounding up "11", for rounding nearest down "01" and for rounding nearest up "10". Injection based rounding with three-bit injection 120 also takes the least significant bit of an operand into account for rounding. Rounding is performed by adding the injection values to an operand and truncating the result.

According to the embodiment of the invention, the third injection is performed with three-bit injection 122 of "000", as shown in FIG. 4c, resulting in unrounded first intermediate results 64 for an addition of two operands 114 and 116 and unrounded second intermediate result 66 for an addition of two operands 114 and 116 plus one.

Thus, FIG. 4c depicts the additional addition on the least significant bit (LSB) part, which serves to allow for tiny check in addition to support two rounding points 110 and 112.

Concerning step (b), the regular tiny check only requires a few leading bits, e.g. the two most leading bits (MSB). That may be performed on first and the second intermediate sums 64 and 66. In step (c), based on carry bit 96 (shown in FIGS. 6 and 7) of the "third" addition of step (a), tiny information 98 and tiny information 99 (shown in FIGS. 6 and 7) are then selected between the two values computed in (b).

Figure 5A:
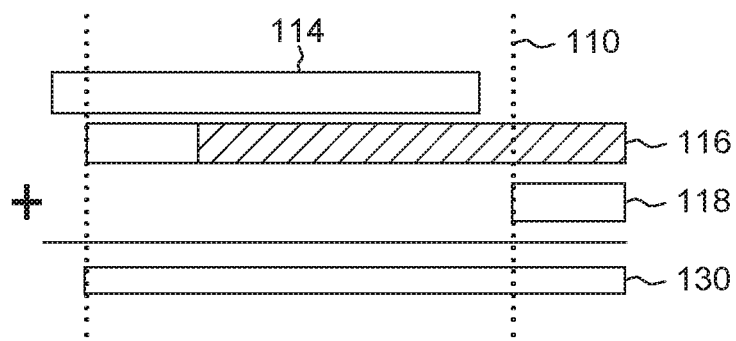
FIG. 5a depicts a subtraction operation with binary injection based rounding at a first rounding point by a two-bit injection, in accordance with one embodiment of the present invention.
Figure 5B:
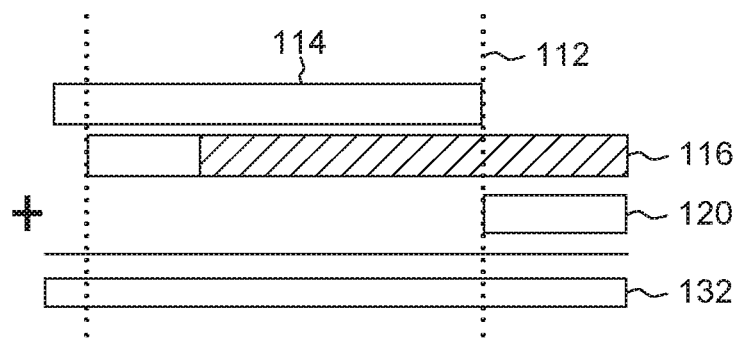
FIG. 5b depicts a subtraction operation with binary injection based rounding at a second rounding point by a three-bit injection, in accordance with one embodiment of the present invention.
Figure 5C:
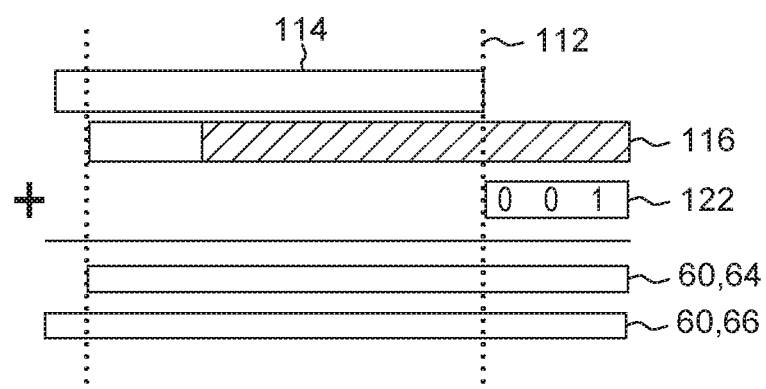
FIG. 5c depicts a subtraction operation without rounding by an injection of one for tiny detection, in accordance with one embodiment of the present invention.

FIG. 5a depicts a subtraction operation with binary injection based rounding at first rounding point 110 by two-bit injection 118. FIG. 5b depicts a subtraction operation with rounding at second rounding point 112 by three-bit injection 120. FIG. 5c depicts a subtraction operation without rounding by injection 122 of one for tiny detection according to an embodiment of the invention.

FIG. 5a to FIG. 5c depict the same processes for a subtraction situation as for the addition in FIG. 4a to FIG. 4c, except that the third injection is performed with three-bit injection 122 of "001".

Figure 6:
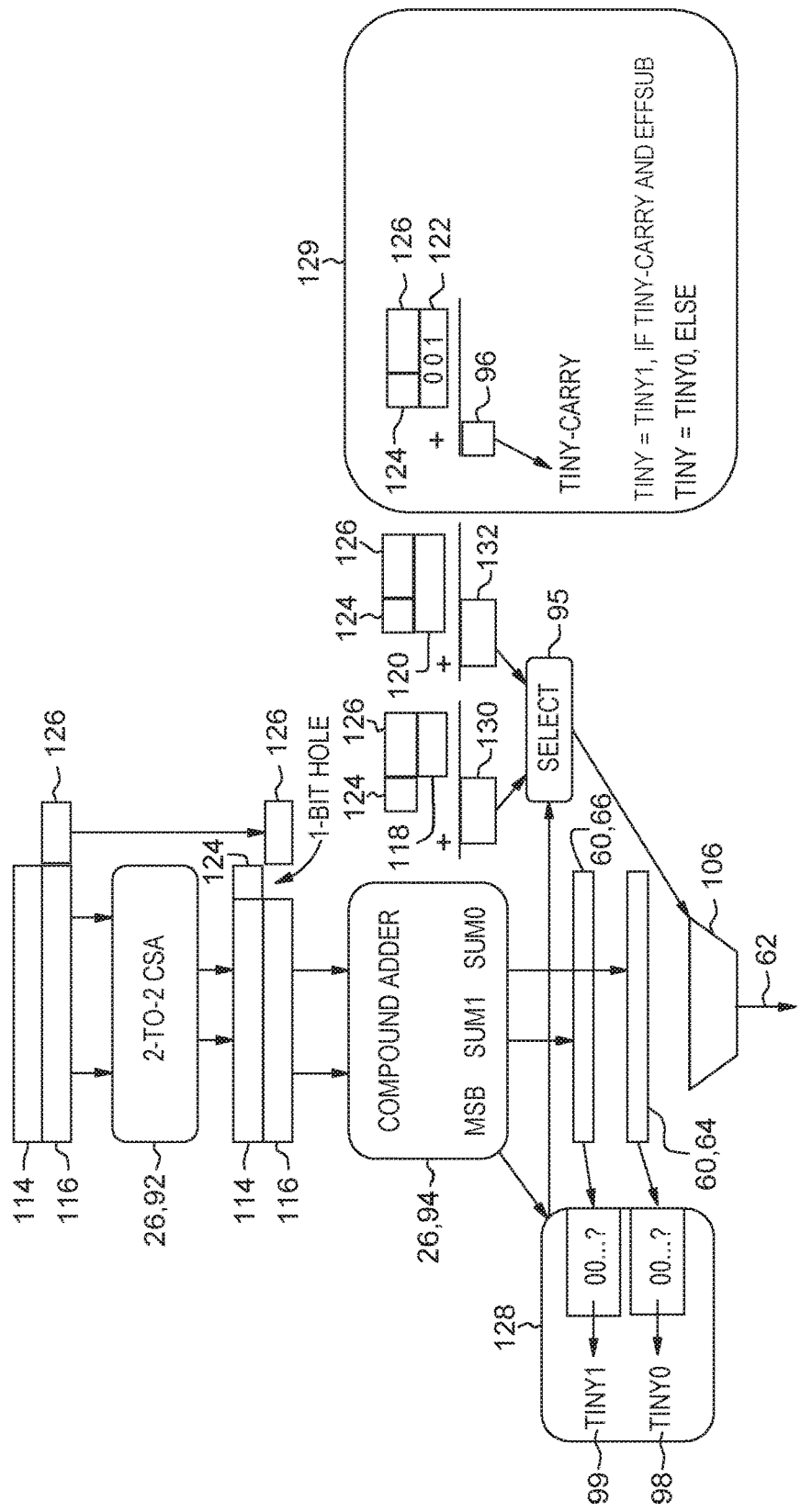
FIG. 6 depicts an enhancement of an adder stage of a floating-point unit for tiny detection, in accordance with one embodiment of the present invention.

FIG. 6 depicts the enhancement of adder 26 of floating-point unit 10 for tiny detection, in accordance with one embodiment of the present invention. Floating-point unit 10 comprises means for performing at least two rounding injections in the addition or subtraction step and at least one further injection 122 with a value of zero for an addition operation or a value of one for a subtraction operation. Adder 26 of floating-point units 10, shown in FIGS. 1 and 2, is enhanced to carry save adder 92 and compound adder 94 in order to perform the addition/subtraction of the fraction and provide rounded result 62 and unrounded result 60 in the same step. Thus, first intermediate sum 64 and second intermediate sum 66 may be determined by carry-save-adder 92 followed by compound adder 94.

Aligned two operands 114 and 116, wherein guard and sticky bits 126 of second operand 116 are marked, are fed to carry save adder 92 comprising a 2-to-2 compressing function thus delivering second operand 116 with a 1-bit hole at the position of least significant bit 124. Operands 114 and 116 are then fed to compound adder 94 for further addition and computation of the normal sum of the two operands as well as the sum plus one. Injections with two-bit injection 118 and three-bit injection 120 are performed for rounding the result as described before, resulting in first and second intermediate results 130 and 132. Based on a carry information from computing the sum and the sum plus one, select circuit 95 determines which result is fed to output multiplexer 106.

Besides general adder 26 for round injection two blocks 128 and 129 are added to perform a tiny detection on an unrounded result. In block 128, first tiny information 98 and second tiny information 99, based on the MSBs of first intermediate sum 64 and second intermediate sum 66, are generated. In block 129, tiny carry bit 96 is generated based on the third injection with the further injection values of "000" for an addition or "001" for a subtraction on the position of least significant bit 124 and guard and sticky bits 126. Unrounded result 60 is detected as tiny according to second tiny information 99 if tiny carry bit 96 equals to one and there is an effective subtraction executed; otherwise, unrounded result 60 is detected as being tiny according to first tiny information 98.

Figure 7:
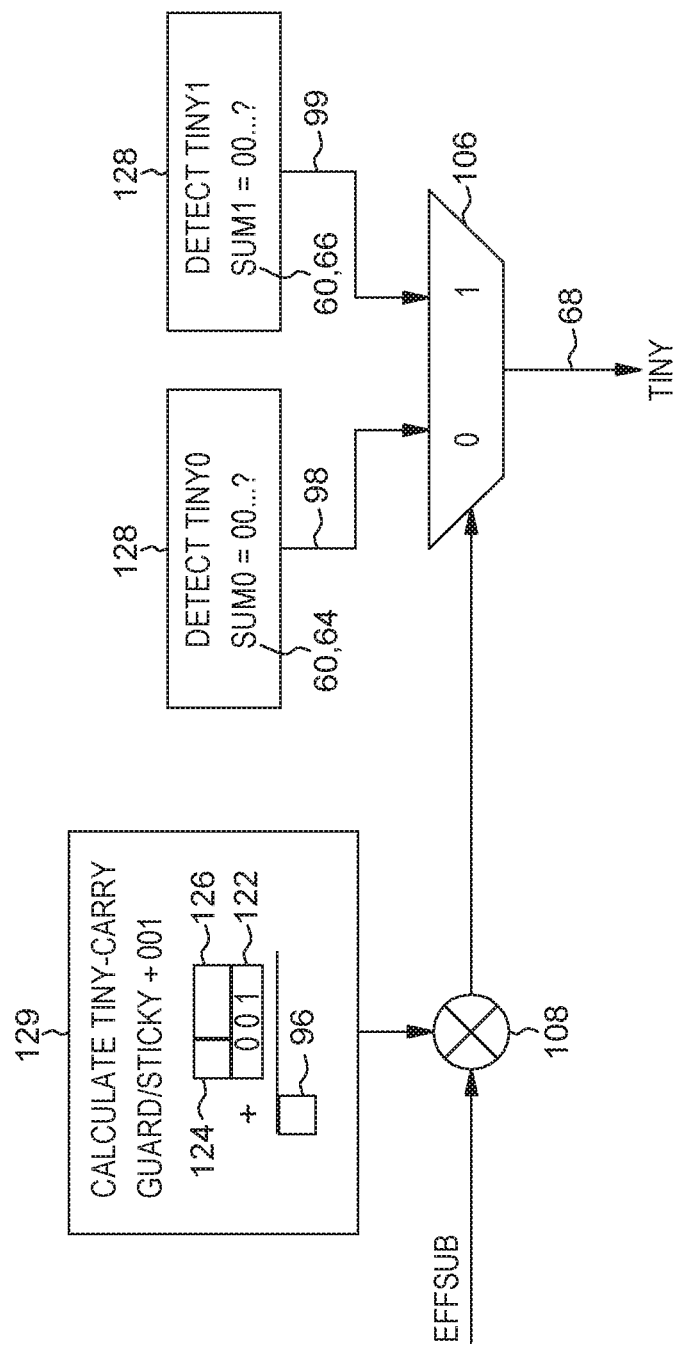
FIG. 7 depicts an additional data flow in an adder stage of a floating-point unit for tiny detection shown in FIG. 6, in accordance with one embodiment of the present invention.

FIG. 7 depicts the additional data flow in the enhanced adder stage of floating-point unit 10 for tiny detection shown in FIG. 6. Block 129 generates tiny carry bit 96 as a three-bit carry detect circuit or a three-bit incrementer; in two blocks 128 (block 128 of FIG. 6 is split into two blocks 128 in FIG. 7), first tiny information 98 and second tiny information 99, based on the MSBs of first intermediate sum 64 and second intermediate sum 66, are generated. This may be performed by a NOR operation on the two most significant bits of intermediate sums 64 and 66. Tiny carry bit 96 and the signal for an effective subtraction effsub as a value of zero or one are fed to an AND circuit 108 whose result serves for controlling multiplexer 106, thus delivering tiny result 68 as first tiny information 98 or second tiny information 99. Second tiny information 99 is then selected as tiny result 68 if tiny carry bit 96 equals to one and there is an effective subtraction executed; otherwise, first tiny information 98 is selected as tiny result 68.

Based on the foregoing, a floating-point unit in a computer system and a method for performing tiny detection in floating-point operations are disclosed. However, numerous modifications and substitutions can be made without deviating from the sprit and scope of the present invention. Therefore, the present invention has been disclosed by way of examples and not limitation.

What is claimed is:

1. A floating-point unit for performing tiny detection in floating-point operations, the floating-point unit comprising:
   a multiplier connected to a dataflow for multiplication two operands and configured to compute a carry-save product iteratively, wherein a sum term and a carry term are separated into a high part and a low part of the carry-save product;
   a left shifter connected to the dataflow for a high part and a low part of an addend operand, configured to deliver an aligned part of an addend;
   a right shifter connected to the dataflow for the high part and the low part of the addend operand, configured to deliver the aligned part of the addend;

a select circuit connected to outputs of the left shifter and the right shifter, the select circuit comprising a 3-to-2 compressor to combine the sum term and the carry term with the addend;

an adder connected to the dataflow from the select circuit;

a first feedback path connecting a carry output of the adder to the select circuit, the first feedback path performing a wide addition operation of the carry-save product and the addend, for the high part and the low part of the carry-save product and the high part and the low part of the addend operand, in two subsequent additions, thus generating an intermediate wide result;

a second feedback path connecting an output of the adder to the left shifter and the right shifter, the second feedback path passing the intermediate wide result through the left shifter and the right shifter for normalization and through the adder for rounding, thus generating a rounded result; and wherein the adder is configured to provide an unrounded result for the tiny detection in the floating-point operations.

2. The floating-point unit of claim 1, wherein two most significant bits of a significand of the unrounded result are used for the tiny detection in the floating-point operations.

3. The floating-point unit of claim 1, wherein the adder is configured to provide the unrounded result in a second addition or subtraction step without a round injection.

4. The floating-point unit of claim 3, wherein the adder is configured to execute the second addition or subtraction step in a multicycle operation.

5. The floating-point unit of claim 4, wherein the adder comprises an additional instruction for executing the second addition or subtraction step in a multicycle operation.

6. The floating-point unit of claim 3, wherein the adder is configured to execute the second addition or subtraction step in pipelined operations by extending the second addition or subtraction step to a two cycle operation.

7. The floating-point unit of claim 1, wherein the adder is configured to provide the rounded result and the unrounded result in an addition step or a subtraction step.

8. The floating-point unit of claim 7, wherein the adder comprises at least a carry-save-adder followed by a compound adder for determining a first intermediate sum and a second intermediate sum.

9. The floating-point unit of claim 7, wherein the floating-point unit performs at least two rounding injections in the addition step or the subtraction step and at least one further injection with a value of zero for an addition step or a value of one for the subtraction step.

10. The floating-point unit of claim 7, wherein the floating-point unit selects a first intermediate sum or a second intermediate sum as the unrounded result for the tiny detection in the floating-point operations, depending on a tiny carry bit of a further injection in the addition step or the subtraction step.

11. The floating-point unit of claim 10, wherein the floating-point unit performs the following steps:

generating a first tiny information and a second tiny information, based on most significant bits of the first intermediate sum and the second intermediate sum respectively;

generating the tiny carry bit, based on a least significant bit, a guard bit, and a sticky bit of a lower operand plus one; and if the tiny carry bit equals to one and an effective subtraction is performed, selecting the second tiny information as a tiny result; otherwise, selecting the first tiny information as the tiny result.

12. The floating-point unit of claim 10, wherein the floating-point unit further performs the further injection with a value one for the subtraction step; otherwise, the floating-point unit further performs the further injection with a value zero.

13. The floating-point unit of claim 12, wherein the floating-point unit performs the following steps:

generating a first tiny information and a second tiny information, based on most significant bits of the first intermediate sum and the second intermediate sum respectively;

generating the tiny carry bit, based on based on a least significant bit, a guard bit, and a sticky bit of a lower operand plus one; and if the tiny carry bit equals to one, selecting the second tiny information as a tiny result; otherwise, selecting the first tiny information as the tiny result.

* * * * *